United States Patent
Perteet et al.

(10) Patent No.: US 11,306,580 B2
(45) Date of Patent: *Apr. 19, 2022

(54) UNDERGROUND GUIDANCE USING ABOVE-GROUND MESH NETWORK

(71) Applicant: The Charles Machine Works, Inc., Perry, OK (US)

(72) Inventors: Brent W. Perteet, Stillwater, OK (US); Scott B. Cole, Edmond, OK (US); Brian K. Bailey, Stillwater, OK (US); Brian J. Schrock, Fulshear, TX (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,068

(22) Filed: Oct. 26, 2020

(65) Prior Publication Data

US 2021/0040840 A1   Feb. 11, 2021

Related U.S. Application Data

(63) Continuation of application No. 15/216,218, filed on Jul. 21, 2016, now Pat. No. 10,822,941.

(60) Provisional application No. 62/245,521, filed on Oct. 23, 2015, provisional application No. 62/195,018, filed on Jul. 21, 2015.

(51) Int. Cl.
| | |
|---|---|
| *E21B 47/0232* | (2012.01) |
| *E21B 47/09* | (2012.01) |
| *E21B 47/024* | (2006.01) |
| *G01V 3/15* | (2006.01) |

(52) U.S. Cl.
CPC ........ *E21B 47/0232* (2020.05); *E21B 47/024* (2013.01); *E21B 47/09* (2013.01); *G01V 3/15* (2013.01)

(58) Field of Classification Search
CPC .... E21B 47/0232; E21B 47/024; E21B 7/046; E21B 47/09; E21B 7/04; E21B 47/02224; G01V 3/15; G01V 3/26; G01V 3/081; G01V 3/08; G01R 33/0206
See application file for complete search history.

(56) References Cited

U.S. PATENT DOCUMENTS

| | | | |
|---|---|---|---|
| 5,923,170 A * | 7/1999 | Kuckes | E21B 47/0228 324/326 |
| 6,005,532 A | 12/1999 | Ng | |
| 6,035,951 A | 3/2000 | Mercer et al. | |
| 6,047,783 A | 4/2000 | Mercer et al. | |
| 6,095,260 A | 8/2000 | Mercer et al. | |

(Continued)

OTHER PUBLICATIONS

Digi "Digi XBee S2C Digimesh 2.4", Product Datasheet, Printed Nov. 22, 2016, 3 pages, from www.digi.com website, Minnetonka, MN.

*Primary Examiner* — Yong-Suk (Philip) Ro
(74) *Attorney, Agent, or Firm* — Tomlinson McKinstry, P.C.

(57) ABSTRACT

A tracking system for communicating a location of a beacon in order to drill a bore path. The beacon is carried by a drill string in a drilling operation. Above-ground trackers are arranged in a path to define an intended underground bore path. The trackers form a multi-node mesh network in communication with a display unit at a drilling rig. A drilling operator guides the drill string in response to tracking data sent from the tracking system.

19 Claims, 5 Drawing Sheets

(56) References Cited

U.S. PATENT DOCUMENTS

| | | | |
|---|---|---|---|
| 6,250,402 B1 | 6/2001 | Brune et al. | |
| 6,364,035 B2 | 4/2002 | Brune et al. | |
| 6,454,023 B1 | 9/2002 | Mercer et al. | |
| 6,457,537 B1 | 10/2002 | Mercer et al. | |
| 6,536,538 B2 | 5/2003 | Brune et al. | |
| 6,640,907 B2 | 11/2003 | Mercer et al. | |
| 6,668,944 B2 | 12/2003 | Brune et al. | |
| 6,727,704 B2 | 4/2004 | Brune et al. | |
| 6,917,202 B2 | 7/2005 | Brune et al. | |
| 6,920,943 B2 | 7/2005 | Mercer et al. | |
| 6,856,135 B2 | 12/2005 | Brune et al. | |
| 6,975,119 B2 | 12/2005 | Brune et al. | |
| 7,021,403 B2 | 4/2006 | Brune et al. | |
| 7,080,698 B2 | 7/2006 | Mercer et al. | |
| 7,084,636 B2 | 8/2006 | Brune et al. | |
| 7,218,116 B2 | 5/2007 | Brune et al. | |
| 7,159,672 B2 | 7/2007 | Mercer et al. | |
| 7,347,280 B2 | 3/2008 | Brune et al. | |
| 7,403,013 B2 | 7/2008 | Brune et al. | |
| 7,510,029 B2 * | 3/2009 | Gunsaulis | E21B 7/10 175/61 |
| 7,562,722 B2 | 7/2009 | Brune et al. | |
| 7,663,373 B1 | 2/2010 | Gard et al. | |
| 7,786,731 B2 * | 8/2010 | Cole | E21B 47/0232 324/326 |
| 8,025,109 B2 | 9/2011 | Brune et al. | |
| 8,393,414 B2 | 3/2013 | Brune et al. | |
| 8,668,030 B2 | 3/2014 | Brune et al. | |
| 8,928,323 B2 * | 1/2015 | Cole | H01Q 1/04 324/326 |
| 10,822,941 B2 * | 11/2020 | Perteet | E21B 47/024 |
| 2014/0111211 A1 | 4/2014 | Cole et al. | |
| 2015/0323696 A1 * | 11/2015 | Cole | G01V 3/15 324/326 |
| 2016/0097272 A1 * | 4/2016 | Moss | G01B 7/14 324/346 |

\* cited by examiner

… (US 11,306,580 B2)

UNDERGROUND GUIDANCE USING ABOVE-GROUND MESH NETWORK

FIELD

This invention relates generally to horizontal directional drilling tracking systems and methods.

SUMMARY

This invention is directed to a system and method of use for guiding the drilling of a bore path. The system includes a magnetic dipole source and an above-ground tracking system. The tracking system is formed as a multi-node mesh network in communication with the magnetic dipole source. The tracking system includes at least two trackers, which are nodes of the network, and a display unit.

DETAILED DESCRIPTION

Horizontal directional drilling is a steerable, trenchless method of installing underground pipes, conduits, and cables using a surface-launched drilling rig. Since horizontal directional drilling is a trenchless method, it results in minimal impact on the surrounding areas and infrastructure. Horizontal directional drilling is particularly useful when trenching or excavating is not practical, such as when it is necessary to drill under existing structures, highways, or bodies of water.

Figure 1:
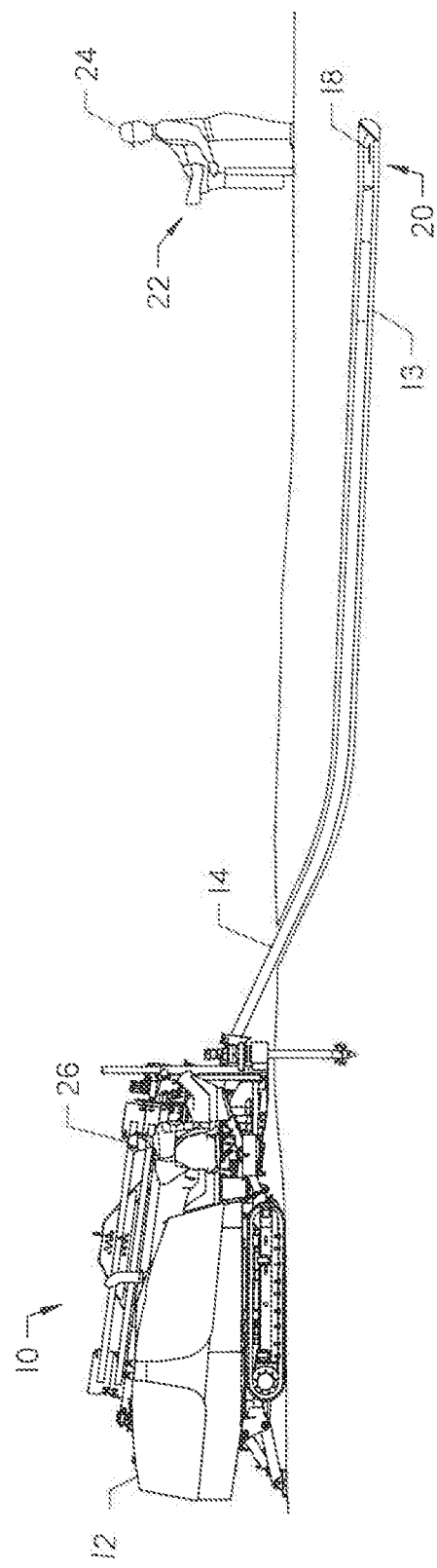
FIG. 1 shows a conventional horizontal directional drilling setup.

Shown in FIG. 1 is a conventional horizontal directional drilling system 10. A drill rig 12 drills a pilot bore 13 by steering a drill string 14 through an area underground. At the front of the drill string 14, a beacon 18 transmits a low frequency dipole magnetic field from a downhole tool 20. An above-ground tracker 22 detects the beacon 18 and guides a tracking operator 24 who walks over the ground above the beacon 18. The tracking operator 24 follows above the beacon 18 and transmits steering information back to a drill operator 26.

A disadvantage of the conventional walkover method of tracking and guiding a beacon 18 is that it requires both the trenching operator 24 and drill operator 26. In many instances, it would be advantageous to track and guide the drilling operation remotely at the drill rig 12, without requiring an operator to follow above the beacon 18.

Figure 2:
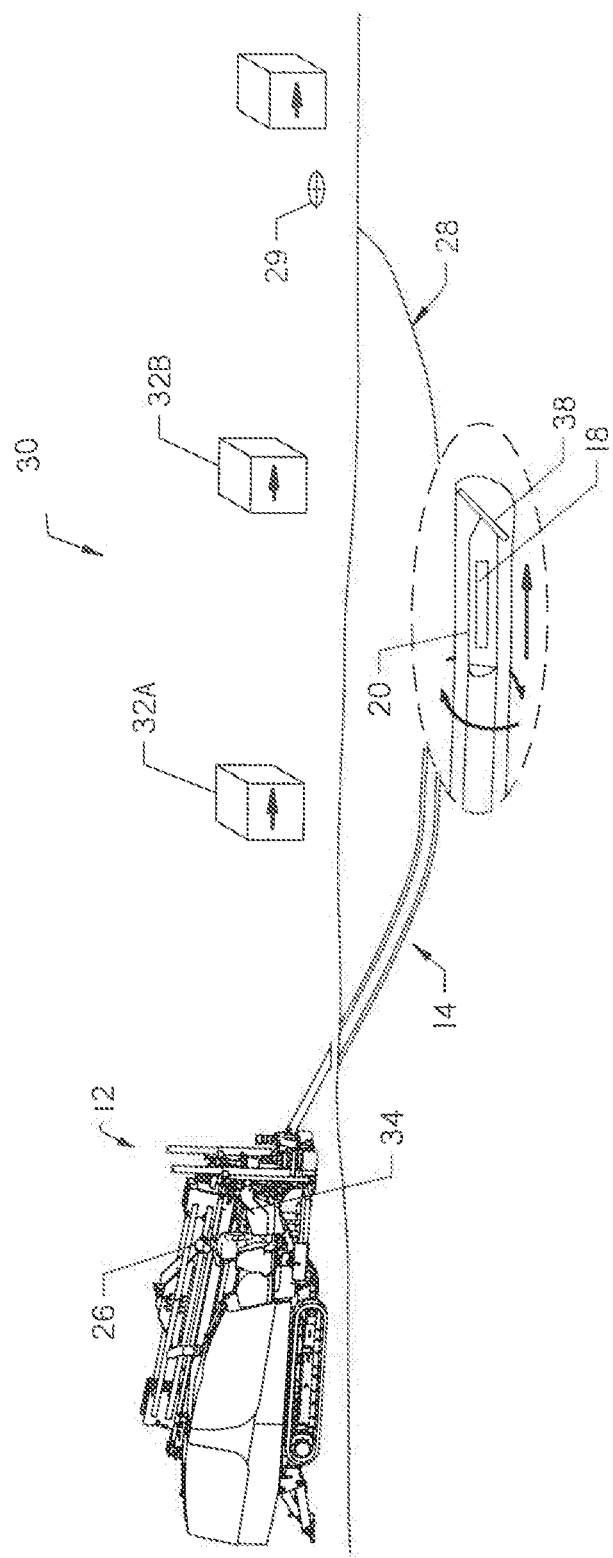
FIG. 2 shows a horizontal directional drilling site where trackers have been arranged along an above-ground path to guide underground boring.

With reference to FIG. 2, the beacon 18 is carried by the drill string 14. The drill string 14 is advanced along a planned bore path 28 towards an exit location 29 and tracked by an above-ground tracking system 30. The tracking system 30 includes a plurality of stationary trackers 32A and 32B that form a part of a multi-node mesh network 50 as will be described with reference to FIG. 3. Tracking data is shown at a display unit 34 located at the drill machine 12 that communicates with the tracking system 30.

The beacon 18 in FIG. 2 may be carried within the downhole tool 20 and may have a steerable drill bit 38. The downhole tool 20 has an internal chamber that holds the beacon 18 in a fixed position relative to the drill bit 38. One end of the downhole tool 20 is threaded for connection onto the drill string 14. Since the position of the beacon 18 is fixed relative to the drill bit 38, sensors in the beacon can be used to detect the boring tool orientation. Additional downhole data, such as temperature, can also be detected by sensors in the beacon 18.

Figure 3:
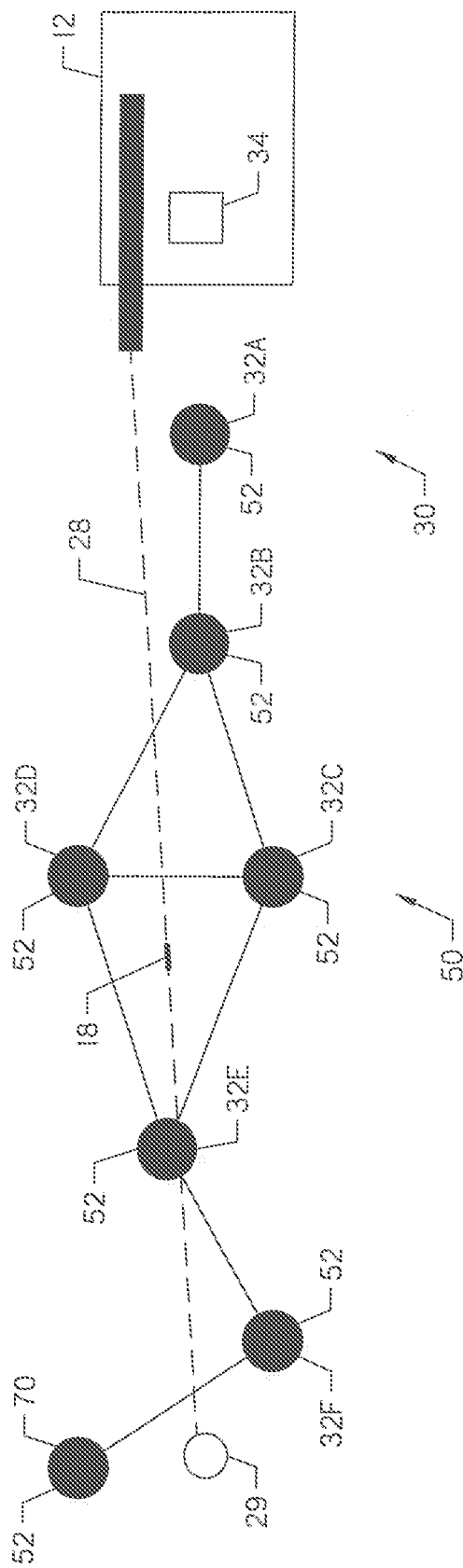
FIG. 3 shows a schematic of a mesh network topology.

With reference to FIG. 3, the tracking system 30 is formed as a mesh network 50, with each tracker 32A-F functioning as a separate node 52. In a mesh network 50, each node 52 can communicate with one or more other nodes in the network.

When nodes 52 of the mesh network 50 are not in direct radio communication with one another, data may be exchanged between them through intermediate nodes in the network. The mesh network 50 can remain functional even as individual nodes 52 appear and disappear. Such events are common-place in underground tracking, due to such factors as radio interference, tracker damage, and powering and depowering of individual trackers 32a-f.

Figure 4:
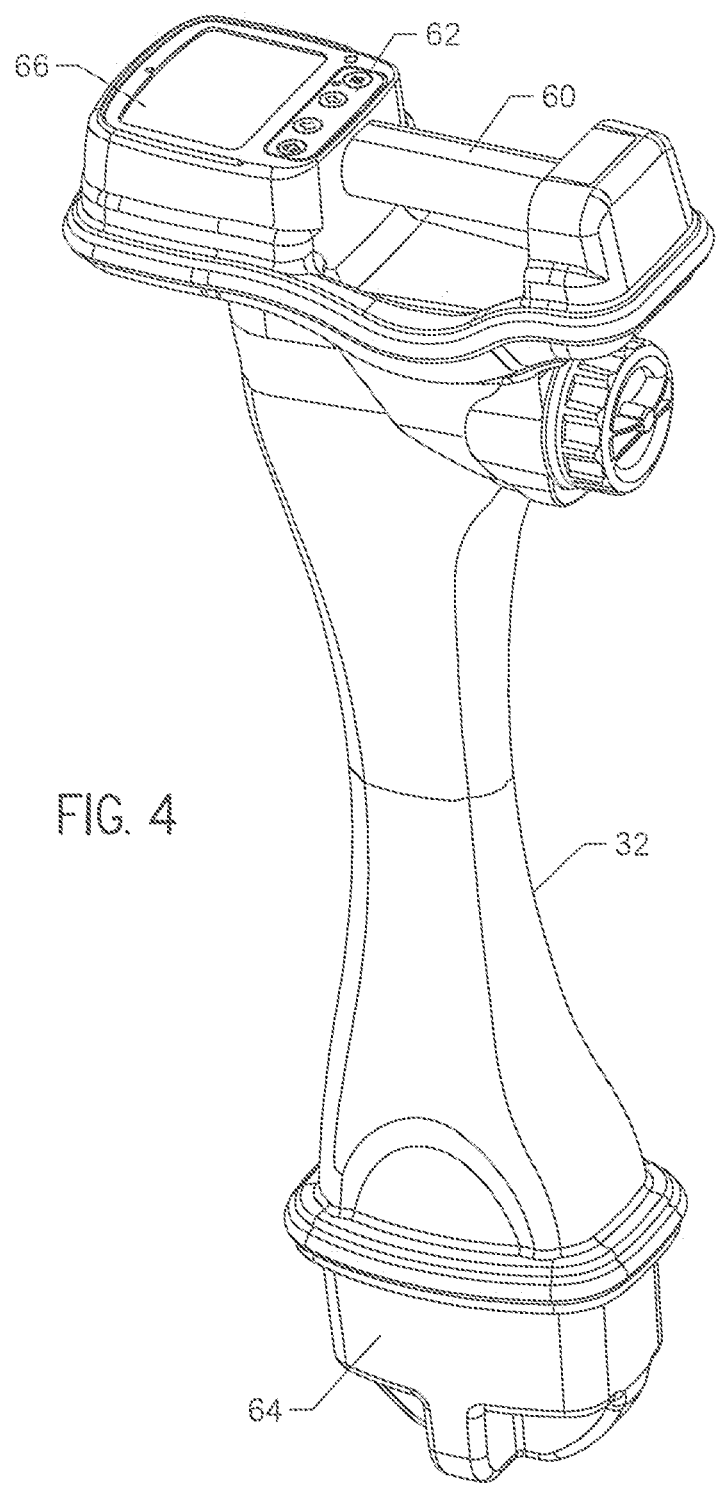
FIG. 4 is an enlarged side view of one of the trackers situated on the horizontal directional drilling site of FIG. 2.

With reference to FIG. 4, the tracker 32 is portable and configured to rest stably on a ground surface. For ease of transport, each tracker 32 is preferably provided with a handle 60.

Each tracker 32A-F comprises a controller 62, such as a computer processor, that receives and processes dipole signal data and directs operation of other components of the tracker. Each tracker further comprises at least one receiving antenna 64, for receiving the dipole signal from the beacon 18. The receiving antenna 64 may be a tri-axial system that measures field components along each of the three orthogonal axes. One such antenna and the methods for calculating beacon 18 location using these antennas are disclosed at length in U.S. Pat. No. 9,329,297 issued to Cole, et al., the contents of which are incorporated herein by reference.

Once received, the dipole signal is digitized and sent to the controller 62. The controller performs any necessary analysis on the digitized dipole signal, and generates original tracking data. That original tracking data may include signal strength, the calculated distance of the dipole source from the tracker, and such information as pitch, roll, temperature, remaining battery life, depth (measured and predicted), distances (horizontal and range), and steering direction. This information may be displayed at a tracker display 66, or may be conveyed to the display 34 of the drilling machine 12 (FIG. 2).

With reference again to FIG. 3, each tracker 32A-F further defines a network broadcast system for receiving tracking data from other nodes 52 of the network 50, and for relaying tracking data to other nodes of the network. Communication between nodes 52 of the network may occur through wires or cables (not shown), but more preferably occurs through a wireless radio link, such as a Bluetooth system.

Each tracker 32A-F is characterized by an active mode and an inactive mode. When a tracker 32A-F is in active mode, the controller 62 (FIG. 4) causes its network broadcast system to transmit its original tracking data to other nodes 52 of the network. When a tracker 32a-f is in inactive mode, no tracking data gathered by its receiving antenna 64 is transmitted by that tracker's broadcast system. Instead, the controller 62 causes the network broadcast system to receive tracking data from adjacent nodes 52. This received tracking data is then relayed to other nodes 52 of the network 50.

One of the trackers 32A-F of the tracking system 30 functions as a server 70 for the network. In addition to the components described above, the server 70 further includes one end of a communication link that relays tracking data broadcast on the network to the display unit 34. Preferably, the communication link is wireless.

When the beacon 18 is used to guide a horizontal directional drilling system, the display unit 34 is preferably located within close visual range of the operator of that system, ordinarily at the drilling rig. With visual access to the display unit 34, the operator can see tracking data broadcast on the network 50, and use that data to steer or otherwise guide the drill string 14 as required. The display unit 34 may include a liquid crystal display panel and input buttons.

Preferably, the controller of the server tracker 70 designates which of the trackers 32A-F within the network 50 is the active tracker, and notifies that tracker as to its active status. In one embodiment, the controller of the server tracker discontinues a tracker's active status in response to a discontinuity in tracking data observed by the then-active tracker. More preferably, active status is ended in response to a discontinuity in field strength reported by the then-active tracker. This lack of field strength may be indicative of the beacon 18 passing out of the area proximate the active tracker.

When active status is ended, the controller 62 of the server tracker 70 causes active status to shift to another tracker 32A-F in the network 50. Preferably, the controller 62 is configured to select the next adjacent tracker along the ground above the bore path for active status.

A tracker 32A-F may optionally be provided with a user interface unit 72 that displays tracking data and other information, and may permit input of programming commands and other user instructions. However, it is contemplated that most of the trackers 32a-f forming the network will not include user interface units. In one embodiment, only one tracker 70, the server tracker, is provided with a user interface.

Trackers 32A-F are arranged in a path on the ground above the intended bore path 28. The trackers 32A-F are then powered on in any order. The order in which a tracker 32a-f is powered on can be used to indicate the tracker's order on the intended bore path 82. When the server tracker 70 is powered on, it periodically broadcasts a signal throughout the network 50 to announce its presence. Other trackers, called client trackers, respond to the server 70 announcement signal. When a client tracker responds, it is registered by the server tracker in a local database.

To compensate for deviations from ideal conditions, including noise, a calibration process is performed. In a system where there are multiple trackers 32A-F, the calibration process would be time consuming and prone to error if each tracker had to be independently calibrated to the beacon. Therefore, the calibration process of the entire system 50 can be performed once between the beacon 18 and a single tracker 32.

Prior to putting the beacon 18 underground, the server tracker 70 is calibrated to the beacon 18. The processor of the server tracker 70 calculates calibration factors specific to the current calibration process. Specifically, the server tracker 70 receives a signal from the beacon 18 and automatically adjusts the frequency of the signal to optimize reception. Calibration factors such as signal strength and signal-to-noise ratio are considered when choosing a calibration frequency. The server tracker then forwards the calibration frequency on to the client trackers. Each tracker's processor adjusts its own stored calibration frequency to match the server 70. Such calibration may take place at an above-ground location near the drill site, as disclosed in U.S. Patent Publication No. 2014-0144704, issued to Cole, et. al. Alternatively, the server tracker 70 and beacon 18 may be calibrated and keyed to one another at an area isolated from electrical interference prior to beginning boring operations.

After calibration, the drill operator begins drilling a bore with a drill string 13 carrying the beacon 18. The server tracker 70 monitors the position of the beacon 18 as measured by the client trackers 32A-F. Preferably, the server 70 is the only tracker 32a-f in the network that forwards tracking information from the beacon 18 to a remote display unit 34. A drill operator uses the tracking information to guide the beacon 18 along the desired bore path until the boring project is complete.

One of the features of the presently disclosed tracking system 30 is that there is no need to calculate the geographical coordinates of any tracker 32A-F in the system. As long as the trackers 32A-F are arrayed above the desired underground bore path 28, the beacon 18 can be guided on that path without any need to ascertain the tracker geographical coordinates.

In the mesh network 5, nodes 52 can be placed in any order and trackers 32A-F can be added to the network at any time. Where a desired bore path is longer than can be defined by the number of trackers 32A-F in use, an operator can reposition one or more of the trackers to continue defining an additional length of the bore path. The trackers can be repositioned as many times as required to complete a boring project.

Figure 5:
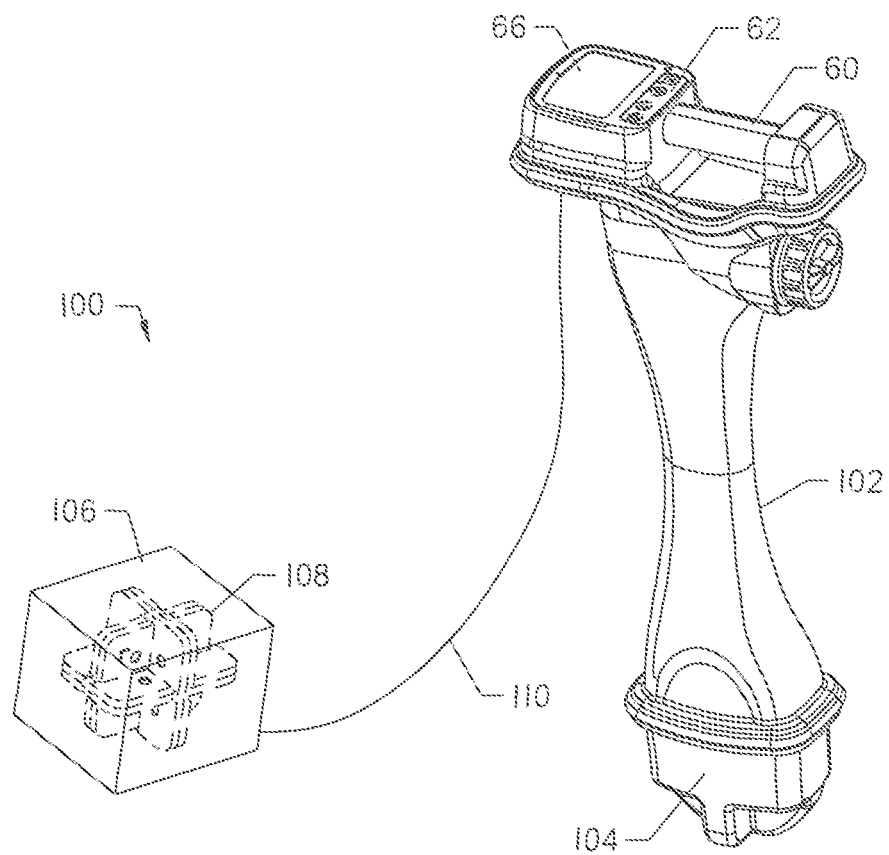
FIG. 5 is a side view of an external antenna system which may be used in the horizontal directional drilling site of FIG. 2.

Shown in FIG. 5 is an external antenna system 100. The external antenna system 100 includes a tracker 102, which has an internal antenna 104. The tracker 102 may have similar components as the tracker 32 of FIG. 4, such as a handle 60, controller 62, etc. However, the external antenna system 100 also includes a second antenna assembly 106 that is located outside of the tracker 102. The second antenna assembly 106 has an antenna 108 and a communication link no to the tracker. The communication link 110 may be wired or wireless. Preferably, the second antenna assembly 106 is waterproof such that it may be placed in water to maintain signal strength when a beacon 18 is below a body of water. The second antenna 106 may be moved along the body of water as the bore progresses, allowing the second antenna 106 to act as a node 52 (FIG. 3) in what would otherwise be a "blind" boring operation.

The external antenna system 100 can be used as two nodes 52 within the tracking system 30 described in FIG. 2. In one embodiment, the tracker 102 is one node 52 and the second antenna assembly 106 is another node of the same tracking system 30. The advantages of using two or more locations to accomplish a tracking function, and a method for doing so, are found in U.S. Pat. No. 7,952,357 issued to Cole, the contents of which are incorporated herein by reference.

Alternatively, the external antenna 106 may be used with the tracker 102 to create two simultaneous tracking antennas over difficult terrain or when an offset tracking position is desired. The external antenna system 100 may operate as a network 50 having two nodes 52 by placing the second antenna 106 a distance in front of the tracker 102 and "leap frogging" as the bore progresses.

One of skill in the art will appreciate that the disclosed invention herein is illustrative of the claimed features and not intended to limit the scope of the following claims.

The invention claimed is:

1. A system, comprising:
a movable underground magnetic dipole source configured to emit a magnetic field;
an above-ground tracking system formed as a multi-node mesh network in communication with the magnetic dipole source, comprising:
at least two nodes, each of the at least two nodes comprising a ground-contacting portable tracker, in which each ground-contacting portable tracker is configured to detect the magnetic field and generate data related thereto, each of the at least two nodes having an active mode and an inactive mode, wherein:
the active mode is characterized by the tracking system using data generated at that node to determine a location of the underground magnetic dipole source; and
the inactive mode is characterized by the tracking system not using data generated at that node to determine a location of the underground magnetic dipole source;
wherein the tracking system is configured to select which of the at least two nodes are in active mode and which of the at least two nodes are in inactive mode in response to changes in the magnetic field detected at nodes then in active mode.

2. The system of claim 1 in which each tracker within the mesh network is configured to relay dipole tracking data to an adjacent node within the mesh network when in the active mode.

3. The system of claim 1 in which each tracker within the mesh network is configured to store calibration data characteristic of that tracker, and to receive and store calibration data originating from another tracker within the mesh network.

4. The system of claim 1 further comprising a display unit in communication with the above-ground tracking system, and configured to receive data from any of the at least two portable trackers which are in the active mode.

5. The system of claim 4 in which the mesh network comprises:
at least one client node that communicates only with adjacent nodes; and
one and only one server node that communicates with adjacent client nodes and with the display unit.

6. The system of claim 5 in which the mesh network includes a plurality of client nodes.

7. The system of claim 1 in which:
the tracking system is configured to select one and only one node for active mode; and
in which the nodes are configured to only relay tracking data originating from the node then in active mode.

8. The system of claim 1 in which the tracking system is configured to select a different node for active mode in response to a discontinuity in the dipole tracking data observed by the node then in active mode.

9. The system of claim 1, in which the tracking system is configured to choose one of the at least two nodes for active mode in response to the proximity between each of the plurality of nodes and the movable underground dipole source.

10. The system of claim 9 in which the at least two nodes are arranged on a predetermined above-ground path overlying the movable underground dipole source.

11. The system of claim 1 in which the at least two nodes of the mesh network are configured to communicate wirelessly.

12. The system of claim 1 wherein at least one tracker further comprises a display module.

13. The system of claim 1, further comprising:
an underground drill string;
a directional downhole boring tool attached to the underground drill string, the directional downhole boring tool comprising:
a threaded end for connection to the drill string; and
a steerable drill bit;
wherein the magnetic dipole source is disposed within the directional downhole boring tool.

14. A method of using the system of claim 13, comprising:
advancing the underground drill string;
causing the moveable underground dipole source to emit a magnetic field while the underground drill string is advancing;
with a first node of the at least two nodes, receiving the magnetic field and transmitting data to one or more other nodes of the at least two nodes; and
subsequently, in response to changes in the magnetic field detected at the first node, changing the first node of the mesh network from the active mode to the inactive mode; and
changing a second node of the at least two nodes from the inactive mode to the active mode.

15. The method of claim 14, further comprising:
after changing the second node to the active mode, with the second node, receiving the magnetic field at the second node and transmitting data with the second node to one or more of the other nodes of the at least two nodes.

16. The system of claim 1 in which the above-ground tracking system comprises five nodes.

17. The system of claim 1 in which each of the nodes is configured to be disconnected from the mesh network and reconnected after being moved to a new above-ground location.

18. The system of claim 1 further comprising a processor, the processor configured to:
observe the tracking data at each node;
determine the existence of a discontinuity in the tracking data; and
place the nodes at which a discontinuity is detected in inactive mode.

19. The system of claim 1 in which:
active mode is further characterized by the transmission of data generated by magnetic readings at that node to other nodes; and
inactive mode is further characterized by no transmission of any data generated by magnetic readings at that node to other nodes.

* * * * *

UNITED STATES PATENT AND TRADEMARK OFFICE
CERTIFICATE OF CORRECTION

PATENT NO. : 11,306,580 B2
APPLICATION NO. : 17/080068
DATED : April 19, 2022
INVENTOR(S) : Perteet et al.

It is certified that error appears in the above-identified patent and that said Letters Patent is hereby corrected as shown below:

In the Specification

Column 4, Line 26, please delete "5" and substitute therefore "50".
Column 4, Line 42, please delete "no" and substitute therefore "110".

Signed and Sealed this
Thirty-first Day of May, 2022

*Katherine Kelly Vidal*

Katherine Kelly Vidal
*Director of the United States Patent and Trademark Office*